US008306507B2

(12) United States Patent
Kim et al.

(10) Patent No.: US 8,306,507 B2
(45) Date of Patent: Nov. 6, 2012

(54) DIFFERENTIATED MESSAGE DELIVERY NOTIFICATION

(75) Inventors: Youngae Kim, Mississauga (CA); Andrew Allen, Mundelein, IL (US); John-Luc Bakker, Keller, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 958 days.

(21) Appl. No.: 12/112,822

(22) Filed: Apr. 30, 2008

(65) Prior Publication Data
US 2009/0258633 A1 Oct. 15, 2009

Related U.S. Application Data

(60) Provisional application No. 61/044,386, filed on Apr. 11, 2008.

(51) Int. Cl.
*H04M 1/725* (2006.01)
(52) U.S. Cl. ............. 455/412.2; 455/556.2; 455/518
(58) Field of Classification Search .......... 455/414.1, 455/414.3, 435.1, 90.1, 412.2; 370/401, 370/352, 465; 709/206, 227; 379/93.24, 379/88.12, 88.25
See application file for complete search history.

(56) References Cited

U.S. PATENT DOCUMENTS

| 8,134,956 | B2* | 3/2012 | Siegel et al. | 370/328 |
|---|---|---|---|---|
| 2004/0122977 | A1 | 6/2004 | Moran et al. | |
| 2006/0195565 | A1* | 8/2006 | De-Poorter | 709/224 |
| 2007/0002831 | A1* | 1/2007 | Allen et al. | 370/352 |
| 2007/0105589 | A1* | 5/2007 | Lu | 455/556.2 |
| 2007/0171851 | A1* | 7/2007 | Beckmann et al. | 370/328 |
| 2007/0182541 | A1* | 8/2007 | Harris et al. | 340/506 |
| 2008/0004061 | A1* | 1/2008 | Takeda | 455/518 |
| 2008/0162637 | A1* | 7/2008 | Adamczyk et al. | 709/204 |
| 2008/0212569 | A1* | 9/2008 | Terrill et al. | 370/352 |
| 2009/0239513 | A1* | 9/2009 | Salkintzis et al. | 455/414.1 |
| 2010/0173658 | A1* | 7/2010 | Fan et al. | 455/466 |
| 2010/0232402 | A1* | 9/2010 | Przybysz | 370/338 |

FOREIGN PATENT DOCUMENTS

| EP | 1280314 A2 | 1/2003 |
|---|---|---|
| WO | 9917521 | 4/1999 |
| WO | 0045557 A1 | 8/2000 |
| WO | 0067436 | 11/2000 |

OTHER PUBLICATIONS

EP Partial Search Report; EP Application No. 08165798.3; Jan. 29, 2009; 6 pgs.
N. Freed, et al.; "Sieve Email Filtering: Sieves and Display Directives in XML"; Feb. 25, 2008; 21 pgs.
T. Hansen, et al.; "Sieve Email Filtering: MIME Part Tests, Iteration, Extraction, Replacement and Enclosure"; Feb. 23, 2008; 17 pgs.

(Continued)

*Primary Examiner* — Jean Gelin
*Assistant Examiner* — Mahendra Patel
(74) *Attorney, Agent, or Firm* — Conley Rose, P.C.; J. Robert Brown, Jr.

(57) ABSTRACT

A user equipment (UE) is disclosed. The UE comprises a processor configured to transmit a session initiation protocol (SIP) SUBSCRIBE method request that comprises at least one filter criteria used for selecting specific messages and selecting the information about the messages, where each of the messages is directed to a user identity associated with the UE.

9 Claims, 6 Drawing Sheets

OTHER PUBLICATIONS

R. Mahy; "Sieve Notification Using the Session Initiation Protocol (SIP) Message Summary and Message Waiting Indication Event Package"; Jul. 1, 2007; 14 pgs.

C. Daboo; "Sieve Email Filtering: MIME Extension"; Feb. 4, 2004; 8 pgs.

Knarig Arabshian, et al.; "A Generic Event Notification System Using XML and SIP"; Sep. 12, 2003; 3 pgs.

European Examination Report; EP Application No. 08165798.3; Feb. 18, 2010; 11 pgs.

European Search and Examination Report; EP Application No. 08165798.3; Jun. 17, 2009; 22 pgs.

Freed, N., et al.; Sieve Email Filtering: Sieves and Display Directives in XML; draft-freed-sieve-in-xml-01; Network Working Group; Feb. 25, 2008; 21 pgs.

Hansen, T. et al.; Sieve Email Filtering: MIME part Tests, Iteration, Extraction, Replacement and Enclosure; draft-ieft-sieve-mime-loop-04; Internet Engineering Task Force; Feb. 23, 2008; 17 pgs.

Many, R.; Sieve Notification Using the Session Initiation Protocol (SIP) Message Summary and Message Waiting Indication Event Package; draft-mahy-sieve-notify-sip-00.txt; Sieve WG; Jul. 1, 2007; 14 pgs.

Daboo, C.; Sieve Email Filtering: MIME Extension; draft-daboo-sieve-mime-00; Network Working Group; Feb. 4, 2004; 8 pgs.

Arabshian, Knarig, et al.; A Generic Event Notification System Using XML and SIP; Columbia University; Sep. 12, 2003; 3 pgs.

Olson, S.; A Mechanism for Content Indirection in Session Initiation Protocol (SIP) Messages; draft-ieft-sip-content-indirect-mech-03; SIP; Jun. 2, 2003; 20 pgs.

PCT International Preliminary Report on Patentability; PCT Application No. PCT/US2009/039942; Jul. 28, 2010; 4 pgs.

Bakker, John-Luc, et al.; U.S. Appl. No. 12/256,136, filed Oct. 22, 2008; Title: System and Method for Communication Diversion Notification.

Kim, Youngae, et al.; U.S. Appl. No. 11/952,921, filed Dec. 7, 2007; Title: "Apparatus and Method of Directing a Communication Session to a Communication Device of a Group of Devices Having a Common Registration Identity".

Khartabil, H., et al.; Title: Functional Description of Event Notification Filtering; Network Working Group; RFC 4660; Sep. 2006; 31 pgs.

Khartabil, H., et al.; Title: An Extensible Markup Language (XML)-Based Format for Event Notification Filtering; Network Working Group; RFC 4661; Sep. 2006; 24 pgs.

PCT International Search Report; PCT Application No. PCT/US2009/039942; Nov. 19, 2009; 3 pgs.

PCT Written Opinion of the International Searching Authority; PCT Application No. PCT/US2009/039942; Nov. 19, 2009; 4 pgs.

Korean Office Action; Application No. 10-2010-7025252; Apr. 25, 2012; 10 pages.

* cited by examiner

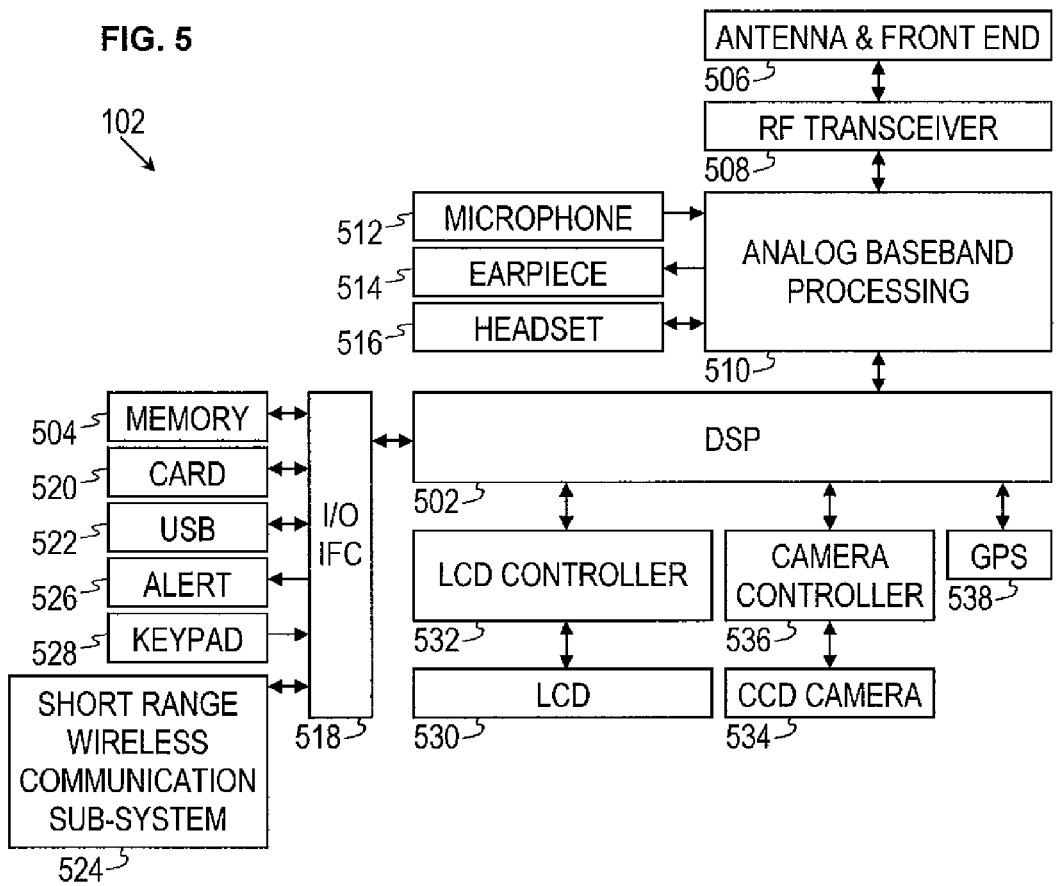
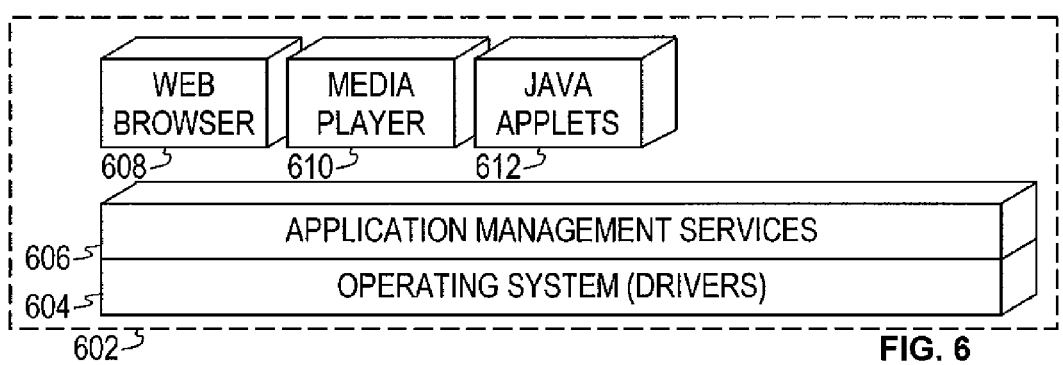

DIFFERENTIATED MESSAGE DELIVERY NOTIFICATION

CROSS-REFERENCE TO RELATED APPLICATIONS

This application claims priority to U.S. Provisional Application No. 61/044,386 filed Apr. 11, 2008, and entitled "Differentiated Message Delivery Notification," by Youngae Kim, et al., which is incorporated herein by reference for all purposes.

BACKGROUND

A variety of communication enabled devices may be employed by users for communications, business, and/or entertainment purposes. These devices may include, but are not limited to, mobile phones, stationary phones, personal digital assistants (PDAs), media players, desktop computers, laptop computers, tablet computers, handheld computers, inventory control handsets, point-of-sale terminals (POSs), set top boxes, and others. All of these devices may be referred to herein as user equipment (UE).

The session initiation protocol (SIP) is a communication protocol that may be used for a variety of purposes including sending and receiving control signals in a network, for example in a network based on the internet protocol (IP). SIP communication exchanges are based on messages exchanged between entities and that are generally structured as request-response pairs. SIP messages are generally human readable.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a block diagram of a user equipment operable for some of the various embodiments of the disclosure.

FIG. 6 is a diagram of a software environment that may be implemented on a user equipment operable for some of the various embodiments of the disclosure.

DETAILED DESCRIPTION

Figure 1:
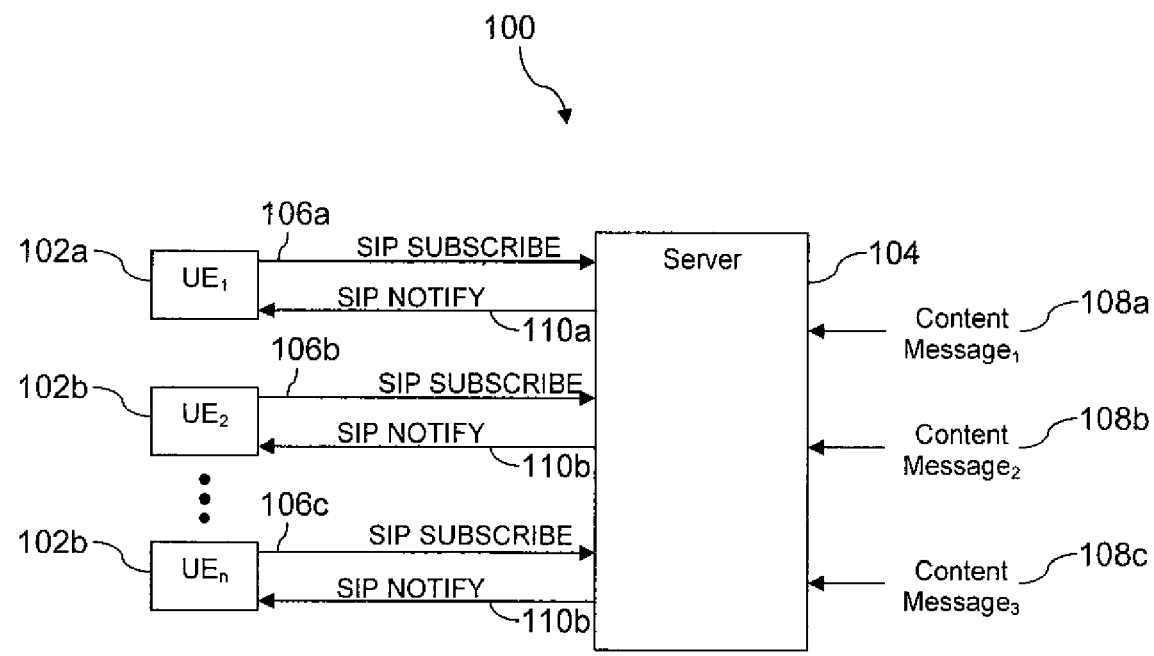
FIG. 1 illustrates a differentiated message delivery notification system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a user equipment (UE) is provided. The UE comprises a processor configured to transmit a session initiation protocol (SIP) SUBSCRIBE method request that comprises a body that defines at least one filtering criteria for selecting a first notification associated with a first one of a plurality of messages to be transmitted to the UE and for selecting the information that in included in said first notification and conditions that need to be satisfied before said first notification is actually transmitted to the UE. Each of the plurality of messages is directed to a user identity associated with the UE. The incoming message could be a SIP MESSAGE method request (see RFC 3428), a message transferred using a SIP session established using SIP INVITE method and transferred using the Message Session Relay Protocol (MSRP) [see RFC 4975], a Short Message Service (SMS) message, a Multimedia Message Service (MMS) message, an Email message or a Voice Mail message or a Multimedia Conversation Message or a Stored Push to Talk Media Burst message or some other type of message containing text or other media components or multiple media components.

In an embodiment, a server is provided. The server comprises a processor configured to receive a plurality of SIP SUBSCRIBE messages from a plurality of user equipments (UEs) associated with a uniform resource identifier (URI). Each SIP SUBSCRIBE method request comprises a body that defines at least one filtering criteria for determining which message to notify, when to send and what to include in a SIP NOTIFY method request to the UE associated with the SIP SUBSCRIBE method request based on the server receiving a message directed to the URI. The processor is further configured to receive a message directed to the URI and to send one of a SIP method request, for example SIP MESSAGE method request, encapsulating the message and a SIP NOTIFY method request associated with the message to at least one of the UEs based on the message and based on the SUBSCRIBE method requests.

In an embodiment, a method of message notification is provided. The method comprises receiving a first SIP SUBSCRIBE method request comprising a body that defines a first notification filter, wherein the first notification filter is associated with a first user equipment (UE) and the first UE is associated with a user identity. The method also comprises receiving a second SIP SUBSCRIBE method request comprising a body that defines a second notification filter, wherein the second notification filter is associated with a second UE and the second UE is associated with the user identity. The method also comprises receiving a first message directed to the user identity and receiving a second message directed to the user identify. The method also comprises sending a first SIP NOTIFY method request associated with the first message to the first UE based on the first notification filter and sending a second SIP NOTIFY method request associated with the second message to the second UE based on the second notification filter.

Turning now to FIG. 1, a system 100 for differentiated message delivery notification is described. The system 100 comprises a plurality of user equipments (UEs) 102 and a server 104. The UEs 102 may be any of a variety of communication devices including a mobile phone, a stationary phone, a desktop computer, a laptop computer, a tablet computer, a personal digital assistant (PDA), a media player, a set-top box, and other communication devices. The UEs 102 may include a first UE 102a, a second UE 102b, and a third UE 102c, each of which is associated with the same uniform resource identifier (URI), as may be the case if each of the UEs 102a, 102b, 102c belong to the same user. For the purposes of the present disclosure, the URI associated with each of the UEs 102a, 102b, and 102c can be referred to as the subject URI, where a PUI (Public User Identity) can be one embodiment of a subject URI, and it is understood that this URI is the same for each of the UEs 102a, 102b, and 102c. Each of the UEs 102a, 102b, and 102c can be identified using GRUU (Globally Routable User Agent URIs—see draft-ieff-sip-gruu). Alternatively the subject URI could be a special SIP URI that is defined as the common URI for the set of devices and references a list of other individual URIs which could be SIP URIs (either public SIP URIs or GRUUs or IP Addresses) or TEL URIs (Telephone numbers) or SIPS URIs or other non SIP URIs or combinations of these. The UEs 102 may have different message presentation capabilities, as for example the presentation capability of a mobile phone may be different from the message presentation capability of a stationary phone, or the message presentation capability of a mobile phone may be different from the message presentation capability of a desktop computer. The system 100 promotes the UEs 102 defining filters and/or profiles that the server 104 uses to differentiate message delivery notification to the UEs 102, for example sending a message embedding video content to a UE 102 that is a set-top box based on the filter, sending a message embedding an audio content to a UE 102 that is a media player, and/or sending a phone call to a hotel phone where the user associated with the URI is temporarily staying while out of town on business.

The first UE 102a may send a first SIP SUBSCRIBE method request 106a to the server 104 that defines which of the messages directed to the PUI are when and how to be notified to the first UE 102a. In an embodiment, the first SIP SUBSCRIBE method request 106a may contain a body portion that defines user preferences and/or characteristics of the messages directed to the PUI to send to the first UE 102a. These preferences and/or characteristics may include a message type, a message subject, a message content, a message size, a media type, a multipurpose internet mail extension (MIME) type, a MIME value, a time or time range, a reason code, a GRUU, and others. The GRUU may be referred to as an identity of a served device. In some contexts, the preferences and/or characteristics may be referred to as filter criteria or as criteria. The filter criteria may be defined using extensible markup language (XML). The server 104 may store the criteria sent in the body of the first SIP SUBSCRIBE method request 106a. Similarly, the second UE 102b may send a second SIP SUBSCRIBE method request 106b to the server 104, and the third UE 102c may send a third SIP SUBSCRIBE method request 106c to the server 104. The second SIP SUBSCRIBE method request 106b defines criteria to the server 104 for sending messages directed to the PUI to the second UE 102b, and the third SIP SUBSCRIBE method request 106c defines criteria to the server 104 for sending messages directed to the PUI to the third UE 102c.

A first example of using XML format to define a SIP NOTIFY body is provided below:

```
<?xml version="1.0" encoding="UTF-8" ?>
<?oxygen RNGSchema="some.rng" type="xml"?>
- <Messages-Waiting status="yes" account="sip:j.doe@example.com">
- <msg-summary>
- <!-- 10 new faxes, 12 old faxes, 9 new urgent faxes, and 11 old urgent
  faxes -->
- <fax-message>
  <new>10</new>
  <old>12</old>
- <urgent>
  <new>9</new>
  <old>11</old>
  </urgent>
  </fax-message>
- <!-- 10 new text messages, 12 old text messages
  -->
- <text-message>
  <new>10</new>
  <old>12</old>
  </text-message>
- <!-- 10 new stored session-infos as described below, 12 old new stored
  session-infos as described below and some urgent session-infos
  -->
- <session-info>
- <context>
  <contact>sip:alice@somewhere.example</contact>
  <info>session information</info>
  </context>
- <stream>
  <new>10</new>
  <old>12</old>
- <urgent>
  <new>9</new>
  <old>11</old>
  </urgent>
  <media-type>audio</media-type>
- <codec>
  <mime-type>audio/PCMU</mime-type>
  </codec>
- <codec>
  <mime-type>audio/1016</mime-type>
  </codec>
- <codec>
  <mime-type>audio/GSM</mime-type>
  </codec>
  </stream>
  </session-info>
  </msg-summary>
  </Messages-Waiting>
```

A second example of using XML format to define a SIP SUBSCRIBE body is provided below:

```
<?xml version="1.0" encoding="UTF-8"?>
<?oxygen RNGSchema="some.rng" type="xml"?>
<Messages-Waiting status="yes" account="sip:jdoe@example.com">
    <msg-filter-conditions>
        <context>
            <and>
                <or>
                <domain>example.com</domain>
                <contact> ... </contact> <!-- element that maps to Contact address and its
parameters -->
                </or>
                <time-range> ... </time-range> <!-- only notify messages received
```

```
within this time range -->
                <accept-contact filter="ICSI"> ... <accept-contact> <!-- filter messages
for presence of IMS Communication Service Identifier value -->
            </and>
        </context>
        <media-types>
            <media-type>audio</media-type>
            <media-type>video</media-type>
        </media-types>
        <codecs>
            <codec>
                <mime-type>audio/G729</mime-type>
            </codec>
        </codecs>
    </msg-filter-conditions>
    <notify>
        <destination> ... </destination> <!-- could be a GRUU -->
        <time-range> ... </time-range> <!-- send notify in this time range, store
otherwise -->
        <include> <!-- specify what information is to be included in notify -->
            <contact filter="GRUU"/> <!-- include contact information (e.g.
sender's GRUU) -->
            <sender/>    <!-- include e.g. SIP's P-Asserted-Identity in NOTIFY's
body -->
            <accept-contact filter="ICSI"> <!-- include ICSI in NOTIFY's body -->
            <mime-type/> <!-- include MIME type -->
            <message-uri/>  <!-- include URI using which message can be
retrieved -->
        </include>
    </notify>
<Messages-Waiting>
```

A plurality of content messages 108 directed to the PUI are shown in FIG. 1 to be received by the server 104. The server 104 sends a plurality of SIP NOTIFY method requests 110 to the appropriate UEs 102. The server 104 may send a first SIP NOTIFY method request 110a associated with a first content message 108a to the first UE 102a based on the criteria provided by the first UE 102a. For example, the criteria provided by the first UE 102a may indicate that audio content directed to the PUI is to be notified to the first UE 102a. The first content message 108a may be audio content. When notified by the server 104 about the first content message 108a, the first UE 102a retrieves the audio content or the URI of the audio content from the server 104 and present the audio content, for example playing the audio content over a headset associated with the first UE 102a.

The server 104 may send a second SIP NOTIFY method request 110b associated with a second content message 108b to the second UE 102b based on the criteria provided by the second UE 102b. For example, the criteria provided by the second UE 102b may indicate that text content directed to the PUI is to be notified to the second UE 102b. The second content message 108b may be text content, for example a text message. When notified by the server 104 about the second content message 108b, the second UE 102b retrieves the text content or URI of the text content from the server 104 and present the text content, for example on a display associated with the second UE 102b.

The server 104 may send a third SIP NOTIFY method request 110c associated with a third content message 108c to the third UE 102c based on the criteria provided by the third UE 102c. For example, the criteria provided by the third UE 102c may indicate that video content directed to the PUI is to be notified to the third UE 102c. The third content message 108c may be video content. When notified by the server 104 about the third content message 108c, the third UE 102c retrieves the video content or the URI of the video content from the server 104 and present the video content, for example on a display associated with the UE 102c.

In an embodiment, the SIP NOTIFY method requests 110 may include a body portion that is provided in XML format. An example of a SIP NOTIFY body in XML format is provided below:

```
<?xml version="1.0" encoding="UTF-8"?>
<?oxygen RNGSchema=" some.rng" type="xml"?>  <Messages-Waiting
status="yes" account="sip:jdoe@example.com">
    <msg-summary>
<!-- 10 new faxes, 12 old faxes, 9 new urgent faxes, and 11 old urgent faxes -->
        <fax-
message><new>10</new><old>12</old><urgent><new>9</new><old>11</old></urgent>
</fax-message>
<!-- 10 new text messages, 12 old text messages -->
        <text-message><new>10</new><old>12</old></text-message>
<!-- 10 new stored session-infos as described below, 12 old new stored session-
infos as described below and some urgent session-infos -->
            <session-info>
                <context>
                    <contact>sip:alice@somewhere.example</contact>
                    <info>session information</info>
```

```
            </context>
            <streams>
               <stream>
                  <media-type>audio</media-type>
                  <local-host-port>host.somewhere.example:49562</local-host-port>
                  <codec><mime-type>audio/PCMU</mime-type></codec>
                  <codec><mime-type>audio/1016</mime-type></codec>
                  <codec><mime-type>audio/GSM</mime-type></codec>
               </stream>
<!--           <stream>
                  <media-type>video</media-type>
                  <local-host-port>host.somewhere.example:51234</local-host-port>
                  <codec><mime-type>video/H261</mime-type></codec>
                  <codec><mime-type>video/H263</mime-type></codec>
               </stream> -->
            </streams>
<new>10</new><old>12</old><urgent><new>9</new><old>11</old></urgent>
         </session-info>
      </msg-summary>
</Messages-Waiting>
```

In the above illustrated manner, the system 100 promotes differentiated message delivery notification. While a simple example is provided above, it will be readily appreciated that many other variations are possible, all of which are contemplated by the present disclosure. For example, while three UEs 102 are illustrated, in a particular case other numbers of UEs 102 may be associated with the PUI. While in the examples discussed above, each of the content messages 108 was notified to only one UE 102, in another circumstance one content message 108 may be notified to more than one UE 102, depending upon the criteria provided in the respective SIP SUBSCRIBE messages sent by the UEs 102 to the server 104. Additionally, in an embodiment, rather than sending SIP NOTIFY method requests 110 or SIP MESSAGE method requests to the UEs 102, the server 104 may send the content message 108 to the UE 102 using other protocols based on the content message 108 and the criteria provided by the UEs 102.

The UEs 102 may send additional SIP SUBSCRIBE method requests 106 over time to update and/or change the filter criteria that the server 104 associates with the UEs 102. For example, the first UE 102a may send a seventh SIP SUBSCRIBE method request 106 that changes the filter criteria that the server 104 associates with the first UE 102a, for example by associating no messages with the first UE 102a in favor of an eighth SIP SUBSCRIBE method request 106 from a hotel phone UE 102 to the server 104 containing a SIP SUBSCRIBE method request 106 having a criteria that indicates that content messages 108 directed to the PUI containing audio content are to be notified to the hotel phone UE 102. The UEs 102 may send additional SIP SUBSCRIBE method requests 106 over time to control the timing of notification deliveries.

Additionally, while only UEs 102 associated with the PUI are depicted in FIG. 1, it is understood that the server 104 may communicate with other UEs 102 associated with different URIs in a manner similar to that described above. For example, a fourth UE, a fifth UE, and a sixth UE (not shown) may be associated with a second URI. Content messages 108 directed to the second URI may be notified to the fourth UE, the fifth UE, and the sixth UE based on criteria provided to the server 104 by the SIP SUBSCRIBE method requests sent to the server 104 by the fourth UE, the fifth UE, and the sixth UE similarly as described with respect to the UEs 102a, 102b, 102c.

The system 100 enables a user, for example the user associated with the PUI, to define differentiated message delivery notification behavior for content messages 108 received from different parties. For example, the user may use the system 100 to configure different notification behavior for content messages received from family, friends, and co-workers. The user, by sending the SIP SUBSCRIBE method requests 106 defining the appropriate filter criteria, may configure call forwarding services to have content messages 108 sent by family members to be notified and/or sent to their mobile phone UE 102, content messages 108 sent by friends to be notified and/or sent to their personal voice mail, and content messages 108 sent by co-workers to be notified and/or sent to their office voice mail. The system 100 may enable a user to make themselves accessible to content messages 108 as the user moves from the office, to home, to a media room, to a permanent residence, to a vacation home, to a second home, to a hotel room without having to distribute a dynamic list of telephone numbers to each of the people who may possibly need to send a message. The system 100 promotes the user directing content messages 108 to the UE 102 that is most suitable to presenting the content message 108.

Figure 2:
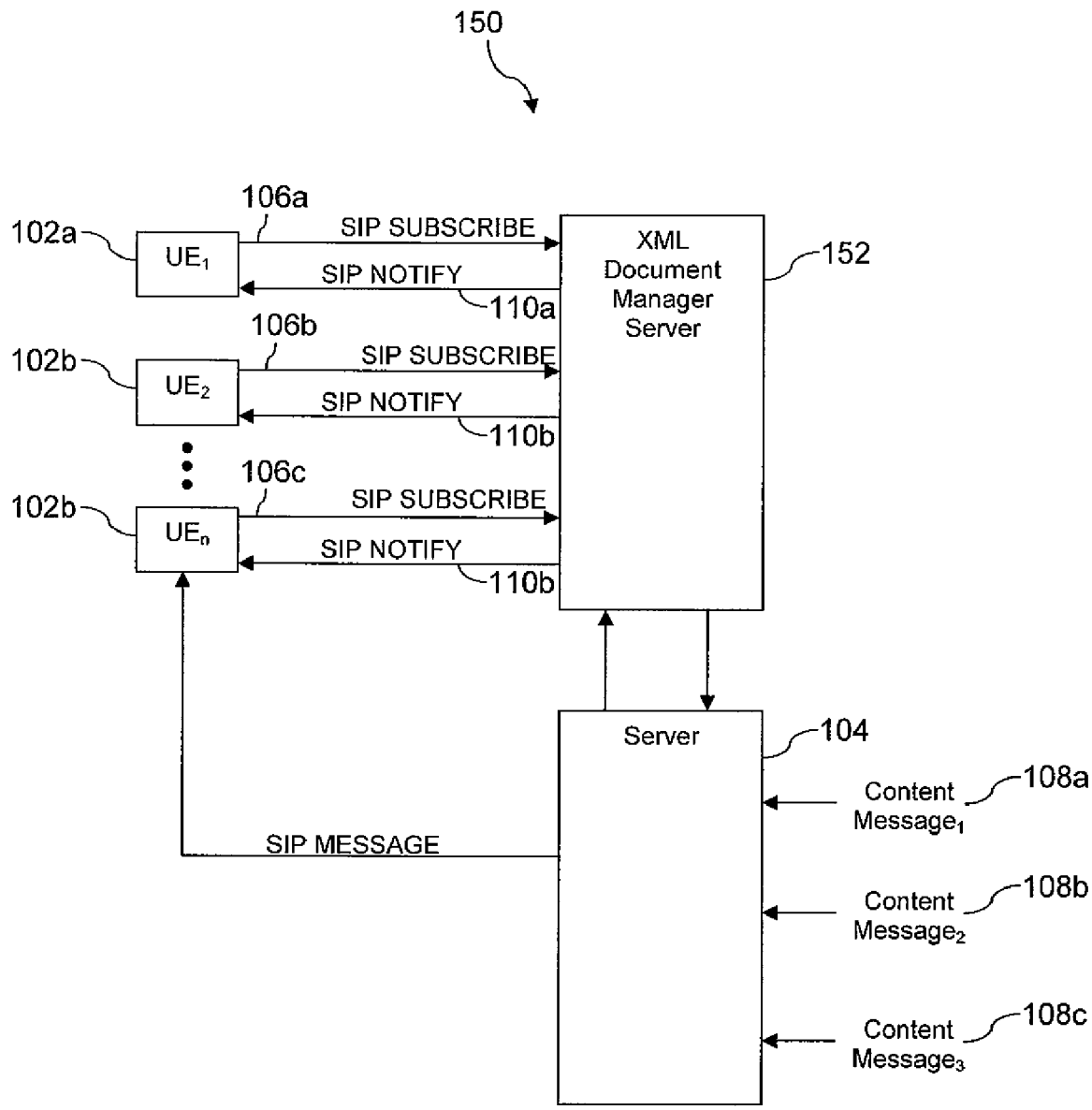
FIG. 2 illustrates another differentiated message delivery notification system according to an embodiment of the disclosure.

Turning now to FIG. 2, a system 150 for differentiated message delivery notification is described. The system 150 is substantially similar to the system 100, but adds an XML document manager server (XDMS) 152. The XDMS 152 receives the SIP SUBSCRIBE method requests 106 from the UEs 102 and builds an XML document associated with each distinct URI comprised of the several filter criteria provided by the UEs 102 associated with the URI. When the server 104 receives a content message 108, the server 104 communicates with the XDMS 152 using XML configuration access protocol (XCAP) or other protocols. The XDMS 152 searches the XML document associated with the URI to which the content message 108 is directed and sends the XML document to the Server 104. The Server 104 analyzes the received XML document and sends an appropriate UE 102 a SIP MESSAGE method request containing the content message based on the filter criteria in the XML document. The UE 102 may request the content message directly from the server 104, for example by use of a URI or other addressing method.

Figure 3:
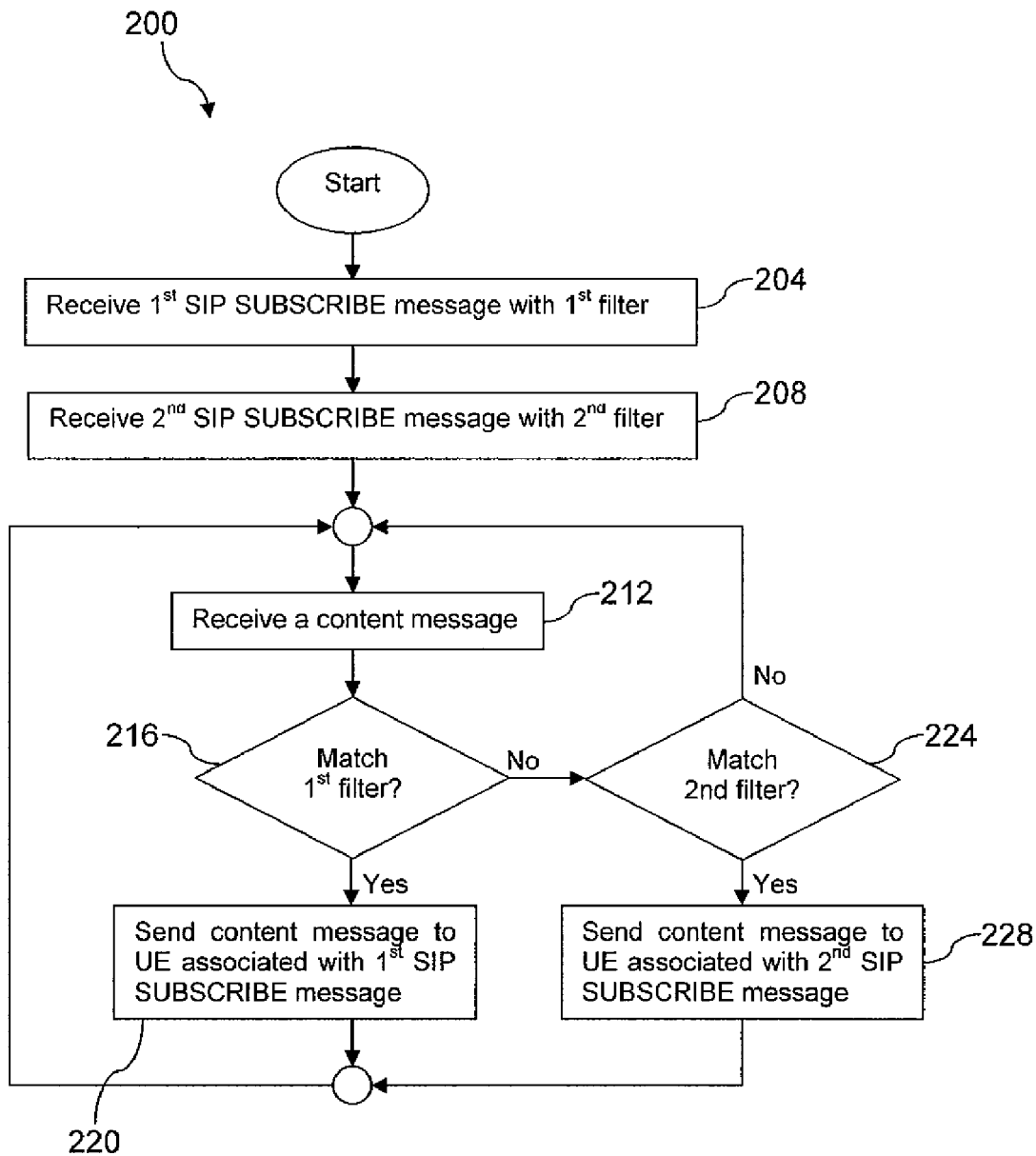
FIG. 3 is a block diagram depicting a method of differentiated message delivery notification according to an embodiment of the disclosure.

Turning now to FIG. 3, a method 200 of differentiated method delivery notification is described. At block 204, a first SIP SUBSCRIBE method request containing a first filter criteria is received, for example from the first UE 102a. At block 208, a second SIP SUBSCRIBE method request containing a second filter criteria is received, for example from the second UE 102b. In block 212, a content message is received.

In block 216, if the content message matches the first filter criteria, a SIP NOTIFY method request may be sent to the UE 102 associated with the first filter criteria, for example the first UE 102a. Alternatively, the content message itself or the URI of the content message may be sent to the UE 102 associated with the first filter criteria. The method 200 returns to block 212. Alternatively, the method 200 may check further whether the content message also matches other filter criteria and send either SIP NOTIFY or the content message to additional UEs 102.

In block 216, if the content message does not match the first filter criteria, the method 200 proceeds to block 224. In block 224, if the content message matches the second filter criteria, a SIP NOTIFY method request may be sent to the UE 102 associated with the second filter criteria, for example the second UE 102b. Alternatively, the content message itself or the URI of the content message may be sent to the UE 102 associated with the second filter criteria. The method returns to block 212.

By looping through blocks 212, 216, 220, 224, 228 the method 200 provides differentiated message delivery notification. While not shown in FIG. 3, the method 200 may also adapt to later received SIP SUBSCRIBE method requests, either from additional UEs 102 and/or update SIP SUBSCRIBE method requests from UEs 102 that had sent SIP SUBSCRIBE method requests earlier.

Figure 4:
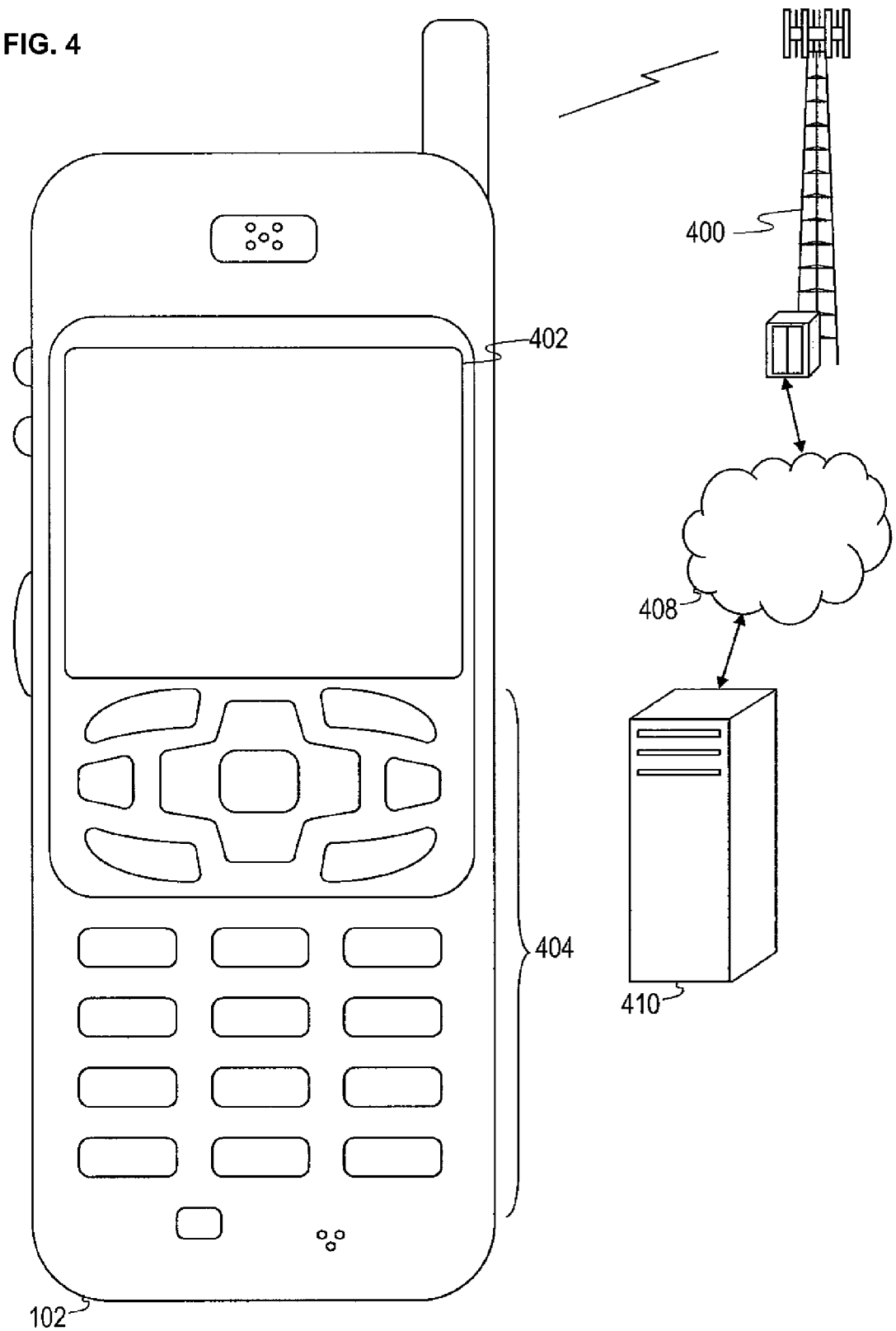
FIG. 4 is a diagram of a wireless communications system including a user equipment operable for some of the various embodiments of the disclosure.

FIG. 4 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

FIG. 5 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 6 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the control signal management.

Figure 7:
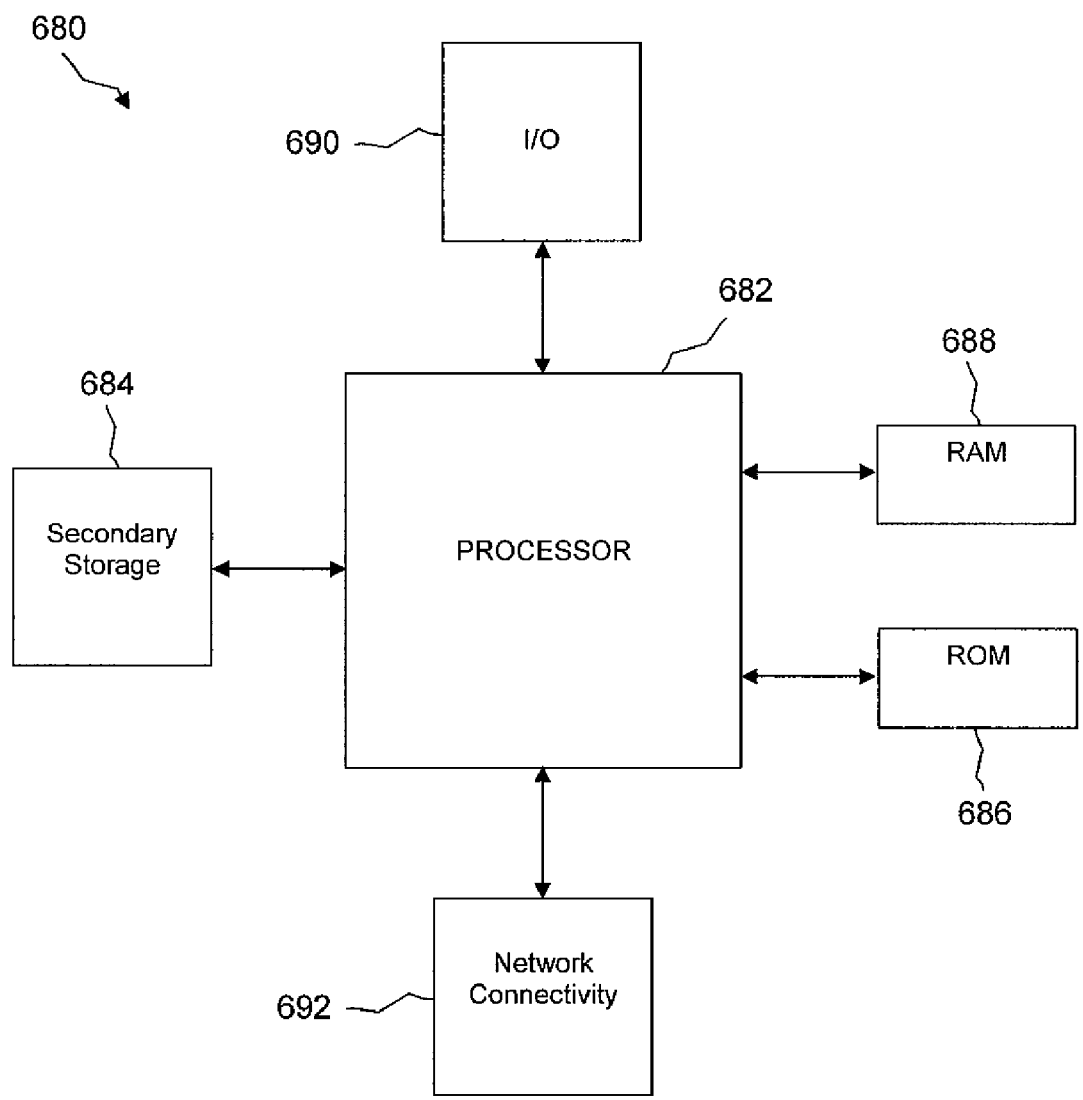
FIG. 7 illustrates an exemplary general-purpose computer system suitable for implementing some aspects of the several embodiments of the present disclosure.

Some aspects of the systems 100 and 150 described above, for example the server 104, the XMDS 152, and some embodiments of the UE 102, may be implemented on any general-purpose computer with sufficient processing power, memory resources, and network throughput capability to handle the necessary workload placed upon it. FIG. 7 illustrates a typical, general-purpose computer system suitable for implementing aspects of one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave. The network connectivity devices 692 may also include one or more transmitter and receivers for wirelessly or otherwise transmitting and receiving signal as are well know to one of ordinary skill in the art.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

Incorporated herein by reference for all purposes is $3^{rd}$ Generation Partnership Project (3GPP) Technical Specification (TS) 24.504, and related Request for Comments (RFC) 3842 and 3265.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of message notification, comprising:
receiving at a server a plurality of session initiation protocol (SIP) SUBSCRIBE method requests comprising a plurality of notification filters associated with a plurality of user equipments (UEs) associated with a common public user identity (PUI), wherein each of the notification filters is configured to filter messages according to at least one of a message type and a media type, wherein a first notification filter of the plurality of notification filters is associated with a first one of the plurality of UEs, and wherein a second notification filter of the plurality of notification filters is associated with a second one of the plurality of UEs different from the first one;
receiving at the server a first message and a second message, wherein the first message satisfies the first notification filter and the second message satisfies the second notification filter, and wherein the first and second messages are addressed to the common PUI;
notifying the first one of the plurality of UEs in accordance with the first notification filter that the first message is available for retrieval; and
notifying the second one of the plurality of UEs in accordance with the second notification filter that the second message is available for retrieval.

2. The method of claim 1, further including creating an extensible markup language (XML) document in accordance with the first notification filter and the second notification filter and sending the XML document to an XML document management server (XDMS) for storage and access.

3. The method of claim 1, wherein each notification filter comprises a uniform resource identifier (URI) uniquely identifying each UE.

4. The method of claim 3, wherein the URI comprises one of a TEL Uniform Resource Identity (URI), a SIP URI, a secure SIP URI, an instant message URI, and a global routable user URI (GRUU).

5. The method of claim 1, wherein at least one message comprises a session initiation protocol "SIP" request.

6. The method of claim 5, wherein notifying the first one of the plurality of UEs comprises sending a SIP NOTIFY request.

7. The method of claim 5, wherein notifying the first one of the plurality of UEs comprises sending a SIP MESSAGE request.

8. The method of claim 5, wherein at least one SIP SUBSCRIBE method request comprises an extensible markup language "XML" document containing a notification filter, and wherein the method further comprises:
   storing the XML document in an XML document management server "XDMS".

9. The method of claim 1, wherein the second notification filter is described in extensible markup language "XML" format.

* * * * *